(12) United States Patent
Mitter

(10) Patent No.: US 11,665,145 B1
(45) Date of Patent: May 30, 2023

(54) METHOD OF PROVIDING END TO END ENCRYPTION WITH AUDITABILITY

(71) Applicant: Navroop Mitter, Boyds, MD (US)

(72) Inventor: Navroop Mitter, Boyds, MD (US)

( * ) Notice: Subject to any disclaimer, the term of this patent is extended or adjusted under 35 U.S.C. 154(b) by 0 days.

(21) Appl. No.: 14/702,713

(22) Filed: May 2, 2015

Related U.S. Application Data

(60) Provisional application No. 61/988,009, filed on May 2, 2014.

(51) Int. Cl.
*H04L 9/40* (2022.01)
*H04L 9/08* (2006.01)

(52) U.S. Cl.
CPC ........ *H04L 63/0442* (2013.01); *H04L 9/0894* (2013.01); *H04L 63/0435* (2013.01)

(58) Field of Classification Search
CPC .............. H04L 63/0442; H04L 9/0894; H04L 63/0435
USPC .......................................................... 713/150
See application file for complete search history.

(56) References Cited

U.S. PATENT DOCUMENTS

| | | | | |
|---|---|---|---|---|
| 6,061,792 | A * | 5/2000 | Simon | G06Q 30/06 705/76 |
| 6,836,548 | B1 * | 12/2004 | Anderson | G06F 21/72 380/255 |
| 9,319,223 | B2 * | 4/2016 | Nix | G06F 21/35 |
| 2007/0071241 | A1 * | 3/2007 | Caprella | H04L 41/28 380/270 |
| 2007/0094141 | A1 | 4/2007 | Viavant | |
| 2009/0116650 | A1 * | 5/2009 | Cizas | G06F 21/76 380/278 |
| 2009/0196423 | A1 | 8/2009 | Chandrasekaran et al. | |
| 2009/0300758 | A1 * | 12/2009 | Hauck | H04L 9/321 726/21 |
| 2011/0022835 | A1 * | 1/2011 | Schibuk | G06Q 20/382 713/153 |
| 2011/0033050 | A1 * | 2/2011 | Mailer | G06Q 30/02 380/259 |
| 2012/0204032 | A1 * | 8/2012 | Wilkins | H04L 9/006 713/170 |
| 2012/0330798 | A1 | 12/2012 | Fox | |

(Continued)

FOREIGN PATENT DOCUMENTS

FR  2987711 A1 * 9/2013 ............... H04L 9/30

OTHER PUBLICATIONS

Ido Kanter, Secure exchange of information by synchronization of neural networks, EPL:2002; p. 1 -11.*

*Primary Examiner* — Monjur Rahim
(74) *Attorney, Agent, or Firm* — Law Office of Jerry Joseph, PLC; Jerry K. Joseph

(57) ABSTRACT

A method of performing secure end to end communication between users, the method includes registering a plurality of devices corresponding to a first user having a first user profile stored within a repository, each device having a unique asymmetric public-private key pair, publishing the public key of each device of the first user on the first user profile, storing the private key of each device on corresponding device of the first user, using the published public keys, a second user encrypting and sending a secure message to the first user, and receiving and decrypting the encrypted secure message from the second user on all registered devices corresponding to the first user stored within the repository using the stored private key on each device.

4 Claims, 6 Drawing Sheets

(56) References Cited

U.S. PATENT DOCUMENTS

| | | |
|---|---|---|
| 2013/0012167 A1 | 1/2013 | Reeves et al. |
| 2013/0191630 A1 | 7/2013 | Ylonen et al. |
| 2013/0198522 A1 | 8/2013 | Kohno et al. |
| 2013/0262858 A1* | 10/2013 | Neuman ................ H04L 63/08 713/155 |
| 2014/0075524 A1* | 3/2014 | Ho .......................... G06F 21/42 726/6 |
| 2015/0095648 A1* | 4/2015 | Nix ................... H04W 52/0235 713/170 |
| 2016/0134594 A1* | 5/2016 | Teo ....................... H04L 9/0819 713/171 |

* cited by examiner

METHOD OF PROVIDING END TO END ENCRYPTION WITH AUDITABILITY

CROSS-REFERENCE TO RELATED APPLICATIONS

This application claims the benefit of U.S. Provisional Patent Application No. 61/988,009, filed on May 2, 2014, the disclosures of which are incorporated herein in their entirety by reference.

BACKGROUND OF THE INVENTION

1. Field of the Invention

The present general inventive concept relates to a method of performing secure end to end encrypted communications between users while providing an end to end encrypted audit trail and reduced key management burdens.

2. Description of the Related Art

Pretty Good Privacy (PGP) and Secure/Multipurpose Internet Mail Extensions (S/MIME) have been used for years as a means of packaging end to end encrypted communications, particularly those over electronic mail (e-mail). In each case, a user is represented by a public-private key pair, whereby communications intended for a particular recipient are transmitted after encrypting the message, information, or file with a symmetric key which is then itself encrypted with each intended recipient's asymmetric public key and transmitted as a package containing the symmetric key encrypted message, information, or file, and a list of one or more copies of the asymmetric key encrypted symmetric key.

This method of securing communications or packages for intended recipients was well suited for environments in which users had one device, typically a computer, on which they would receive and respond to secured communications. Where necessary, users and or support staff would transport an asymmetric private key to additional devices so messages could be received or responded to from an additional device. This cumbersome step introduced security vulnerabilities and complexities, not to mention a poor user experience relating to the extraction, storage, and transport of a users asymmetric private key.

The recent ubiquity of powerful smart phones, tablets, and other computing devices and non-secure messaging clients, applications, and apps has resulted in an expectation of message or communication availability on all of a users devices. Similarly, the desire to have secure communications delivered to and responded to from multiple devices simultaneously has risen and has been supported by business cases for many users.

Further, where audit trails were required, such as in corporate environments or regulated industries, previous methods for secure communications required maintaining a copy of all users' asymmetric private keys centrally to aid in decryption of all messages as required. This presented additional challenges around key maintenance, storage, and transport. Without, this centralized storage of all users asymmetric private keys, decryption for audit purposes would not be possible, and these implementations would be end to end encryption solutions unsuitable for environments where an audit trail is required.

In an attempt to simplify asymmetric private key related issues, some secure messengers instead rely on Secure Sockets Layer (SSL) encryption, similar to the encryption leveraged by browsers to communicate securely with web servers in general Internet communications. In this case, encryption is not end to end between a sender and an intended recipient, instead the encryption is between the users app and the provider's Firewall, load balancer, or web server, or another device within the network of the provider. Irrespective of where the SSL encryption terminates within the providers network, at that point all communications are unencrypted, commonly referred to as plain text.

While this method removes the users need to transport an asymmetric private key between devices to enable multi-device receipt and sending of secured messages, and eliminates the need to centrally maintain all users' asymmetric private keys to facilitate the availability of an audit trail, it also exposes all communications to the provider.

Finally, in all methods described above when an audit trail is enabled, granularity of who can view the audit trail or decrypted communications is a matter of access control management and not an actual cryptographic limitation.

In general, secure mobile communications providers fall into two camps: those protecting communications with SSL and exposing plain text on their own servers, and those protecting communications end-to-end, without the presence of an adequate audit trail for regulatory compliance.

Therefore, what is desired is a system and method of performing secure end to end encrypted communications between users, while providing an end to end encrypted audit trail with reduced key management burdens.

BRIEF SUMMARY OF THE INVENTION

The present general inventive concept provides a method of performing secure end-to-end encrypted communications between users while providing an end-to-end encrypted audit trail and reduced key management burdens. In this general inventive concept each user is able to communicate, send, receive, and view, messages securely from a plurality of devices each represented by their own unique asymmetric public-private key pair. Users publish asymmetric public keys representing each of their devices to a repository, such as a database or a directory, from which other users wishing to communicate with them can access all of their public keys at once.

For example, a first user with one laptop, one mobile phone, and one tablet may publish 3 unique and distinct public keys that represent them on each of their devices respectively. A second user is then able to access these 3 public keys and use them during encryption of a message for the first user. While in this inventive concept the second user now performs additional encryption tasks, one for each device of the first user, than what the second user would have performed under other solutions, this occurs in the background and does not impact the experience of the second user. The first user benefits from not having to extract, transport, and import a private key from his laptop to his mobile phone and to his tablet before being able to receive and send messages securely from these additional devices, greatly improving the user experience for the first user. In addition, should the first user lose his laptop, only content encrypted using the public key that corresponds to the private key on the laptop of the first user would need to be removed from the messaging repository and only the public key corresponding to the laptop would need to be removed from the profile of the first user. As a result, the first user could continue to message securely from his mobile phone and or tablet without interruption as other users of the system use the remaining public keys of the first user to communicate with the first user.

In the present general inventive concept, it is also possible to register auditors or reviewers who can review messages sent or received by those to whom they are linked. Auditors also register devices each represented by their own unique asymmetric public-private key pair. Auditors publish asymmetric public keys representing each of their devices to a repository, such as a database or a directory. Auditors are linked to users for whom they should have message review capabilities by an administration application. In the example above, as the second user accesses the 3 public keys that represent the first user, the published public key of a first auditor linked to the first user would also be included, resulting in at least 4 keys being used by the second user when sending the first user a message. While the first user would be able to receive and decrypt the message for viewing on his 3 devices, the first auditor linked to the first user would be able to view the message as well. Had a second auditor been present that was linked to the second user, then while accessing the public keys for the first user and the first auditor linked to the first user, the public keys of the second auditor would also be included. As a result, the second auditor would be able to decrypt and review the message sent by the second user, the first user could decrypt and view the message sent by the second user; and the first auditor could decrypt and view the message received by the first user. Further, if the second user had additional devices, then the additional public keys representing the additional devices of the second user would also have been included and the message would have been encrypted with the public keys of the additional devices of the second user. Once the additional devices of the second user received or retrieved the messages the second user could decrypt and view the sent message on their additional devices. The same would hold true if the roles were reversed and the second user received a message from the first user, each of their devices would use their respective private keys to decrypt the message as it was received on their device, and each of the linked or attached auditors, first and second, would be able to decrypt and review the message. This approach has multiple benefits for an organization. First, an organization can setup one auditor or reviewer for multiple users, and safeguard the private key of this auditor or reviewer to use later decrypt and view messages for multiple users. This eliminates the need to track the private keys of every user, substantially reducing key management burden. Second, an organization can assign different reviewers or auditors to different subsets of its user, thereby limiting who can review who, supporting a need to know model. Reviewers can have overlapping responsibilities. Third, reviewers can be assigned for specific periods of time and then removed or de-linked from users, thereby limiting the portion of a user's messages they can later review. Fourth, a master auditor or reviewer, can be assigned to all parties in an organization and used in case of loss or compromise of a private key belong to an auditor or reviewer. There are multiple additional benefits to this approach.

In particular, an embodiment of the present general inventive concept allows a first user to register multiple devices to the service, each with their own unique asymmetric public-private key pair, the public key of which is published to the profile of the first user to facilitate distribution of all of the public keys representing currently registered devices of the first user to a second user wishing to send the first user a secure message which can be received and responded to from a plurality of currently registered devices of the first user.

The present general inventive concept also provides for the linking of zero, one, or more auditors to a first user's profile to facilitate the distribution of the asymmetric auditor public keys representing each auditor linked to a first user profile to a second user wishing to send the first user a secure message where an audit trail is required. A unique asymmetric auditor public-private key pair represents each auditor.

Additional aspects and utilities of the present general inventive concept will be set forth in part in the description which follows and, in part, will be obvious from the description, or may be learned by practice of the general inventive concept.

Features and/or utilities of the present general inventive concept may be achieved by providing a method of performing secure end to end communication between users, the method includes registering a plurality of devices corresponding to a first user having a first user profile stored within a repository, each device having a unique asymmetric public-private key pair, publishing the public key of each device of the first user on the first user profile, storing the private key of each device of the first user on the corresponding device of the first user, using the published public keys, a second user encrypting and sending a secure message to the first user, and receiving and decrypting the encrypted secure message from the second user on all registered devices corresponding to the first user stored within the repository using the corresponding stored private key on each device of the first user.

Receipt and decryption of the encrypted secure message from the second user only occurs on devices with a public key published to the first user profile when the second user encrypted and sent the secure message.

The second user may have a second user profile stored within the repository.

The second user profile may include public keys of each device corresponding to the second user.

The private key of each device may be stored on the corresponding device of the second user. The second user may store a private key corresponding to each device of the second user on the corresponding device.

The second user may encrypt and send a secure message to the first user from one device of the second user and to the remaining devices on the second user profile using the published public keys on the first user profile and the published public keys on the second user profile, wherein the method may further include receiving and decrypting the encrypted secure message from the second user on all registered devices corresponding to the first user using the unique asymmetric private key stored on each device of the first user and receiving and decrypting the encrypted secure message from the second user on all remaining devices corresponding to the second user using the unique asymmetric private key stored on each device of the second user.

That is, in an alternative embodiment, a second user encrypts a message to the first user with a symmetric key; encrypts the symmetric key with each of the published public keys on the first user profile; sending the encrypted message and the encrypted symmetric keys to the first user; where on each device receipt and decryption of an encrypted symmetric key occurs using the stored private key on each device of the first user; and receipt and decryption of the encrypted secure messages occurs using the decrypted symmetric key.

The receiving and decrypting the encrypted secure message from the second user may occur on each device with a public key published to the first user profile when the second user encrypted and sent the secure message.

The method may further provide for a second user encrypting and sending a secure message to the first user with a symmetric key which includes encrypting the symmetric key with each of the published public keys on the first user profile, sending the encrypted message and the encrypted symmetric keys to the first user, receiving and decrypting the encrypted symmetric key stored private key of each device corresponding to the first user, and receiving and decrypting the encrypted secure message using the decrypted symmetric key decrypted on all registered devices corresponding to the first user stored within the repository.

Features and/or utilities of the present general inventive concept may also be achieved by providing a method of performing and auditing secure end to end communication between users, the method including registering a plurality of devices corresponding to a first user having a first user profile and a second user having a second user profile stored within a repository, each device having a unique asymmetric public-private key pair, publishing the public key of each device of the first user on the first user profile, publishing the public key of each device of the second user on the second user profile, registering an auditor device corresponding to a first auditor having a first auditor profile stored within the repository, the auditor device having a unique auditor asymmetric public-private key pair, publishing the public key of the auditor device corresponding to the first auditor on the first auditor profile, linking the first auditor profile to the first user profile, using the published public keys on the first user profile and the published public key on the first auditor profile linked to the first user profile and the published public keys on the second user profile, a second user encrypting and sending a secure message to the first user, the first auditor, and the remaining devices of the second user, receiving and decrypting the encrypted secure message from the second user on all registered devices corresponding to the first user stored within the repository, receiving and decrypting the encrypted secure message from the second user on the auditor device corresponding to the first auditor linked to the first user profile, and receiving and decrypting the encrypted secure message from the second user on all remaining registered devices corresponding to the second user stored within the repository.

The receiving and decrypting the encrypted secure message from the second user may occur on the auditor device corresponding to the auditor linked to the first user profile, each of the devices of the first user profile, and each of the devices on the second user profile when the second user encrypted and sent the secure message.

Wherein when a first auditor is required for the first user and a second auditor is required for the second user, an auditor device is registered corresponding to a second auditor having a second auditor profile stored within the repository, the auditor device having a unique auditor asymmetric public-private key pair; publishing the public key of the auditor device corresponding to the second auditor on the second auditor profile; and linking a second auditor profile to the second user profile; and wherein using the published public keys on the second auditor profile linked to the second user profile, the published public keys on the first user profile and the published public key on the first auditor profile linked to the first user profile and the published public keys on the second user profile, a second user encrypts and sends a secure message to the first user, the first auditor whose profile is linked to the first user profile, the second auditor whose profile is linked to the second user profile, and the remaining devices of the second user; and receiving and decrypting the encrypted secure message from the second user on all registered devices corresponding to the first user stored within the repository; and receiving and decrypting the encrypted secure message from the second user on the auditor device corresponding to the first auditor linked to the first user profile; and receiving and decrypting the encrypted secure message from the second user on the auditor device corresponding to the second auditor linked to the second user profile; and receiving and decrypting the encrypted secure message from the second user on all remaining registered devices corresponding to the second user stored within the repository.

Wherein an auditor device may be registered corresponding to a second auditor having a second auditor profile stored within the repository, the auditor device having a unique auditor asymmetric public-private key pair, the method may further include publishing the public key of the auditor device corresponding to the second auditor on the second auditor profile, linking the second auditor profile to the second user profile, wherein using the published public keys on the second auditor profile linked to the second user profile, the published public keys on the first user profile and the published public key on the first auditor profile linked to the first user profile and the published public keys on the second user profile, a second user encrypts and sends a secure message to the first user, the first auditor whose profile is linked to the first user profile, the second auditor whose profile is linked to the second user profile, and the remaining devices of the second user, receiving and decrypting the encrypted secure message from the second user on all registered devices corresponding to the first user stored within the repository, receiving and decrypting the encrypted secure message from the second user on the auditor device corresponding to the first auditor linked to the first user profile, receiving and decrypting the encrypted secure message from the second user on the auditor device corresponding to the second auditor linked to the second user profile, and receiving and decrypting the encrypted secure message from the second user on all remaining registered devices corresponding to the second user stored within the repository.

Wherein the receiving and decrypting the encrypted secure message from the second user occurs on the auditor device corresponding to the first auditor linked to the first user profile and the auditor device corresponding to the second auditor linked to the second user profile when the second user encrypted and sent the secure message.

Wherein when a first auditor is required for the first user and a second auditor is required for the second user, the receiving and decrypting the encrypted secure message from the second user occurs on the auditor device corresponding to the first auditor linked to the first user profile and the auditor device corresponding to the second auditor linked to the second user profile when the second user encrypted and sent the secure message.

Wherein a second user encrypts a message to the first user with a symmetric key, the method may further include encrypting the symmetric key with each of the published public keys on the first user profile, encrypting the symmetric key with the published public key on the auditor profile linked to the first user profile, encrypting the symmetric key with each of the published public keys on the second user profile, sending the encrypted message and the encrypted symmetric keys to the first user, the auditor, and the remaining devices on the second user profile, receiving and decrypting the encrypted symmetric key using the stored private key on each device of the first users, receiving and decrypting the encrypted secure message using the decrypted symmetric key decrypted on all registered devices corresponding to the first user stored within the repository, receiving and decrypting the encrypted symmetric key using the stored auditor private key on the auditor device, receiving and decrypting the encrypted secure message using the decrypted symmetric key decrypted on the auditor device, receiving and decrypting the encrypted symmetric key using the stored private key on each of the remaining devices of the second user, and receiving and decrypting the encrypted secure message using the decrypted symmetric key decrypted on all of the remaining registered devices corresponding to the second user stored within the repository.

In an alternative embodiment, a second user encrypts the symmetric key with each of the published public keys on the first user profile; encrypts the symmetric key with the published public key on the auditor profile linked to the first user profile; encrypts the symmetric key with each of the published public keys on the second user profile; sending the encrypted message and the encrypted symmetric keys to the first user, the auditor, and the remaining devices on the second user profile; where on each device receipt and decryption of an encrypted symmetric key occurs using the stored private key on each device of the first users; where on each device receipt and decryption of the encrypted secure message occurs using the decrypted symmetric key decrypted on all registered devices corresponding to the first user stored within the repository; where receipt and decryption of an encrypted symmetric key occurs using the stored auditor private key on the auditor device; where receipt and decryption of the encrypted secure message occurs using the decrypted symmetric key decrypted on the auditor device; and where receipt and decryption of an encrypted symmetric key occurs using the stored private key on each of the remaining devices of the second user; and where receipt and decryption of the encrypted secure message occurs using the decrypted symmetric key decrypted on all of the remaining registered devices corresponding to the second user stored within the repository.

Features and/or utilities of the present general inventive concept may also be achieved by providing a computer based secure end to end communication system including a means for registering a plurality of devices corresponding to a first user having a first user profile stored within a repository, each device having a unique asymmetric public-private key pair, a means for publishing the public key of each device of the first user on the first user profile, a means for storing the private key of each device on corresponding device of the first user, using the published public keys, a second user encrypting and sending a secure message to the first user and a means for receiving and decrypting the encrypted secure message from the second user on all registered devices corresponding to the first user stored within the repository using the stored private key on each device.

BRIEF DESCRIPTION OF THE DRAWINGS

These and/or other utilities and aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
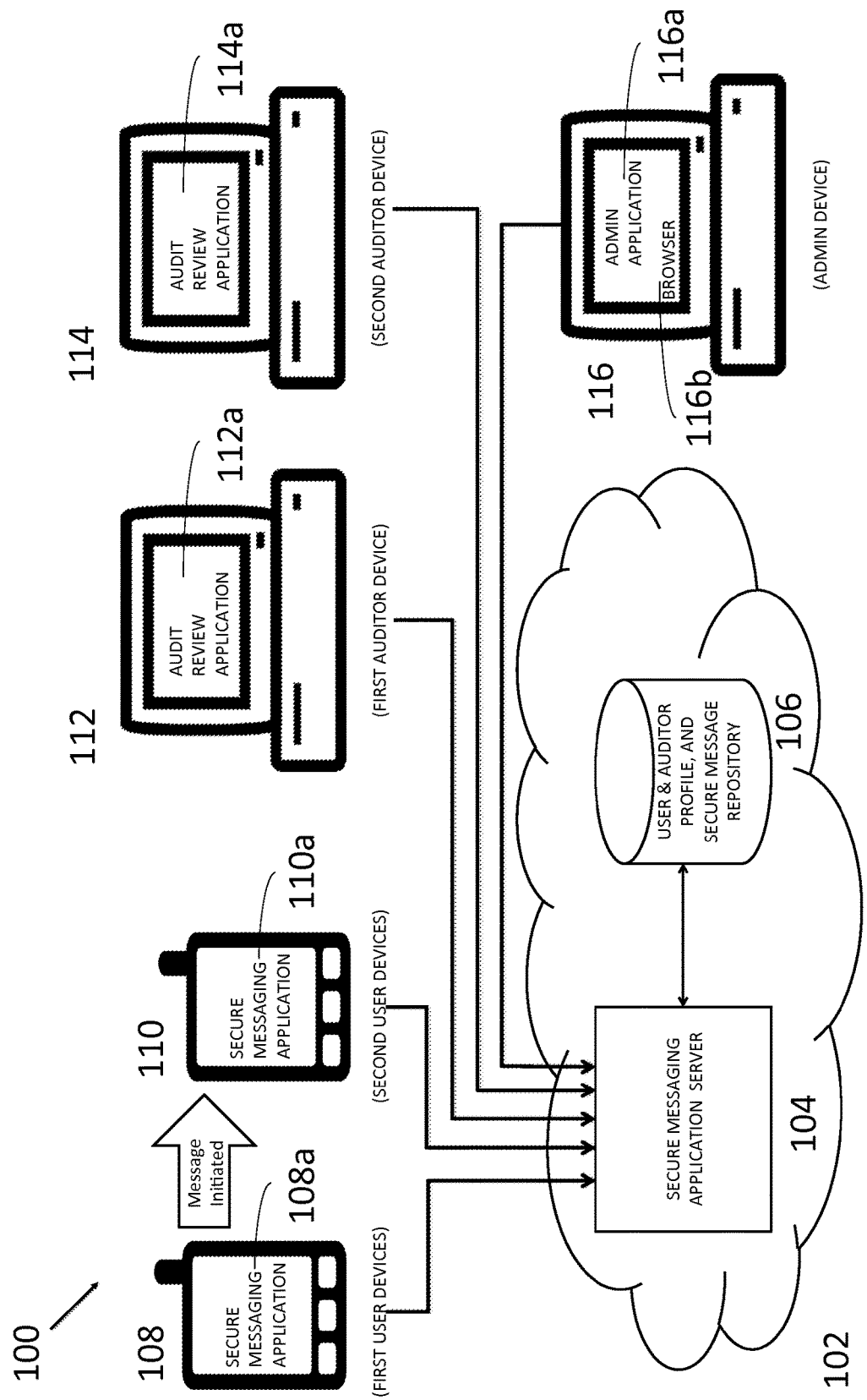
FIG. 1 is a schematic block diagram of a secure end-to-end encrypted communications system according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures. However, the present general inventive concept may be embodied in many different forms and should not be construed as limited to the embodiments set forth herein; rather these embodiments are provided so that this disclosure will be thorough and complete, and will convey the scope of the inventive concept to those skilled in the art.

An auditor, or designee, generates a unique auditor asymmetric public-private key pair, the public key of which is published to the providers server representing the auditor, while the auditors asymmetric private key is never provided to, maintained, or stored by the provider. When zero auditor keys are present on the first and the second users profiles, message are sent with end to end encryption and no audit trail is available. When one or more auditors' asymmetric public keys are present on the first or the second users profiles at the time of sending a particular message containing, text, audio, video, images, or other attachments, the corresponding auditors' asymmetric private keys can be used to decrypt the message. When a symmetric key is first used to encrypt the message, the corresponding auditors' asymmetric private keys can be used to first decrypt a copy of the symmetric key used to encrypt the message at the present or a future time which can in turn be used to decrypt the message at that time.

The present general inventive concept provides for the ongoing removal or addition of asymmetric public keys from a users profile. As each message is sent, only the asymmetric public keys present on the senders profile and each intended recipient's profile, in addition to the asymmetric auditor public keys of each auditor linked to the sender and or each intended recipient, are used to encrypt the current message or encrypt a symmetric key which is used to encrypt the current message.

The present general inventive concept provides for the ongoing removal or addition of linked auditors' to a users profile whose asymmetric auditor public keys are used to encrypt messages or encrypt symmetric keys used to encrypt messages when the user is the sender of the message or the intended recipient of the message. Only the asymmetric private keys representing auditors linked to either the sender or recipient of the message at the time of its encryption or at the time of the encryption of a symmetric key used to encrypt a message will be able to decrypt the message or decrypt a copy of the symmetric key encrypted with their respective asymmetric public key which in turn can be used to decrypt the symmetric key encrypted message.

Thus each message is sent and received end to end encrypted by the senders, intended recipients, and linked auditors.

In the case of users and auditors, the provider never receives, maintains, or transmits asymmetric private keys, limiting the providers ability to decrypt communications.

The present general inventive concept provides for an optional digital rights management (DRM) setting or settings that may include limitations on the date and time of expiration of a message or attached content, limitations on the number of views allowed for a message or attached content, limitations on whether a message or attached content can be forwarded, limitations on whether a message or attached content can be copied, limitations on whether a message or attached content can be archived to other cloud/local storage, limitations on where a message or attached content can be viewed, limitations on specific times or time ranges when a message can be viewed, and other similar limitations.

This present general inventive concept provides (1) encryption over the wire and at-rest, (2) a secure audit trail, (3) protection from data mining and 3rd party information requests, (4) granular control of who can audit different portions of a communication thread based on if and when they were linked as an auditor, (5) allows different auditors to have different access to portions of the audit trail based on having limited ability to decrypt only the portion of the audit trail their key allows them to decrypt. Other features include end-to-end message encryption, device specific encryption keys, data lifespan controls (e.g. expiration), end-to-end encrypted audit trail, cryptographic audit control and attachment user-by-user.

The general inventive concept is made possible by use of a user profile or user directory that contains entries for each of a users registered devices and their corresponding public keys from their asymmetric public-private key pairs for each device, and the public keys from the asymmetric public-private key pairs representing any associated, linked, or assigned individual auditors and or public keys from the asymmetric public-private key pairs representing organization wide master audit trails or links to the profiles of such auditors, individual or master, from which the appropriate public keys from the appropriate asymmetric public-private key pairs can be obtained.

Essentially, users, auditors, and organizations can be represented by multiple asymmetric encryption keys and as needed messages can be encrypted from one user to another user to be seen on any of their registered devices while also providing a copy encrypted for any required auditors or organizations listed on the users profile. This allows an auditor listed on or linked to the users profile at the time the message was sent to retrieve the message and decrypt the message locally preventing a service provider from reading the message in between. Additional users and their respective listed or linked auditors can be added to a conversation and the same approach as above would be taken for each of these users.

FIG. 1 is a schematic block diagram of a secure end-to-end encrypted communications system 100 according to an exemplary embodiment of the present general inventive concept.

Referring to FIG. 1, the system 100 includes a secure messaging solution 102 having a secure messaging application server 104 through which secure messages, device registrations, user and auditor profile requests, auditor profile to user profile linking requests, and public key to profile publishing requests are channeled, with user profiles and auditor profiles and corresponding public keys, and secure messages being stored in a common file storage device, memory unit, directory, or database such as a repository 106. However, the present general inventive concept is not limited thereto.

In the present exemplary embodiment, a first user and a second user may each have a plurality of devices 108, 110 having access to the repository 106 via the application server 104. The first user devices 108 and the second user devices 110 store and execute custom designed messaging encryption and decryption software applications 108a and 110a, respectively, according to the present general inventive concept.

The custom designed messaging encryption and decryption software applications 108a and 110a may be stored on a storage medium such as a CD ROM, diskettes, hard drive or other suitable memory device and are programs that are executable by user devices 108, 110, including computers, mobile devices, or tablets to facilitate operations of the system 100 as further set forth below.

The software applications 108a and 110a can (1) send device registration requests to the secure messaging server 104 which stores the device registration to the corresponding user profile in the repository 106; (2) send public key to profile publishing requests to the secure messaging server 104 which stores the public keys on the corresponding user profiles in the repository 106; (3) request users profiles and public keys published to the user profiles in addition to the public keys of auditor profiles linked to requested user profiles for message recipients and senders via the secure messaging server 104 which pulls the necessary user and auditor profiles and public keys published to the profiles from the repository 106; (4) send secure messages by encrypting messages and or encrypting symmetric keys with messages encrypted with symmetric keys using public keys retrieved via the secure messaging server 104; (5) receive or retrieve encrypted messages and or public key encrypted symmetric keys with messages encrypted by symmetric keys addressed to the corresponding user from the secure messaging server 104 which pulls the encrypted messages and or encrypted symmetric keys and messages encrypted by symmetric keys from the repository 106; and (6) decrypt received or retrieved messages or keys using the private key stored on the device. However, the present general inventive concept is not limited thereto.

The first auditor device 112 and the second auditor device 114 store and execute custom designed audit review software applications 112a and 114a respectively, according to the present general inventive concept. The audit review software application according to the present general inventive concept can (1) send device registration requests to the application server 104 which stores the device registration to the corresponding auditor profile in the repository 106; (2) send public key to profile publishing requests to the secure messaging server 104 which stores the public keys on the corresponding auditor profiles in the repository 106; (3) receive or retrieve encrypted messages and or public key encrypted symmetric keys with messages encrypted by symmetric keys addressed to the corresponding auditor from the secure messaging server 104 which pulls the encrypted messages and or encrypted symmetric keys and messages encrypted by symmetric keys from the repository 106; and (4) decrypt received or retrieved messages or keys using the private key stored on the device. However, the present general inventive concept is not limited thereto.

That is, in alternative exemplary embodiments, the custom designed audit review software applications 112a and 114a may be stored on a storage medium such as a CD ROM, diskettes, hard drive or other suitable memory device and are programs that are executable by computers, mobile devices, or tablets to facilitate operations of the system 100 as further set forth below.

The admin device 116 stores and executes software for user administration 116a or a browser 116b to access a user administration website served by the secure messaging application server 104 which, among other functions, can be used to link auditor profiles containing published auditor public keys to user profiles containing published user public keys, wherein the linked profiles and published public keys are stored in the repository 106. However, the present general inventive concept is not limited thereto.

Figure 2:
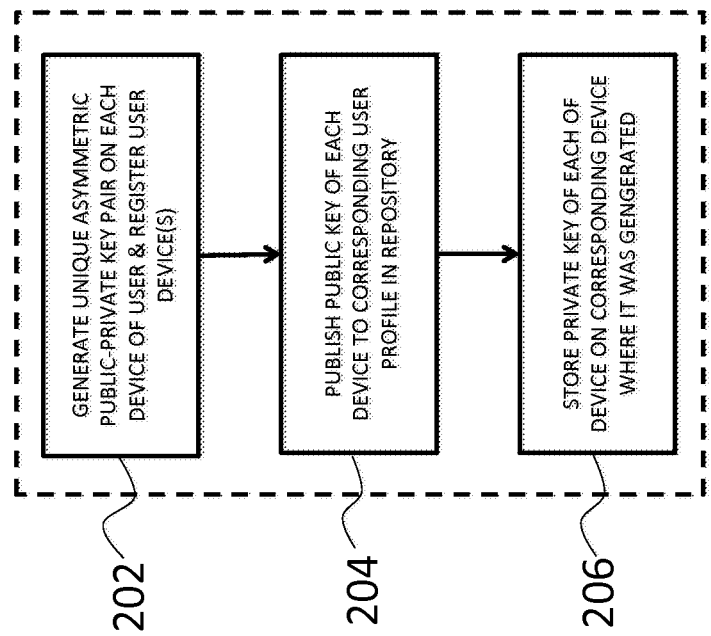
FIG. 2 is a flow chart illustrating a method for enabling devices belonging to a user to receive secure messages according to an exemplary embodiment of the present general inventive concept.

FIG. 2 is a flow chart illustrating a method 200 for enabling devices belonging to a user to receive secure messages according to an exemplary embodiment of the present general inventive concept. The method 200 begins at step 202 in which a unique asymmetric public-private key pair is generated on each device belonging to a user, and the devices are registered with the secure messaging server 104.

In step 204, the public key of each device is published to the corresponding user profile via the application server 104, where the user profile with published public keys is stored in the repository 106.

In step 206, the private key of the unique asymmetric public-private key pair generated on each device is stored on the device it was generated on and remains solely on that device. In exemplary embodiments, the second user has a second user profile stored within the repository, which may include public keys of each device corresponding to the second user.

Figure 3:
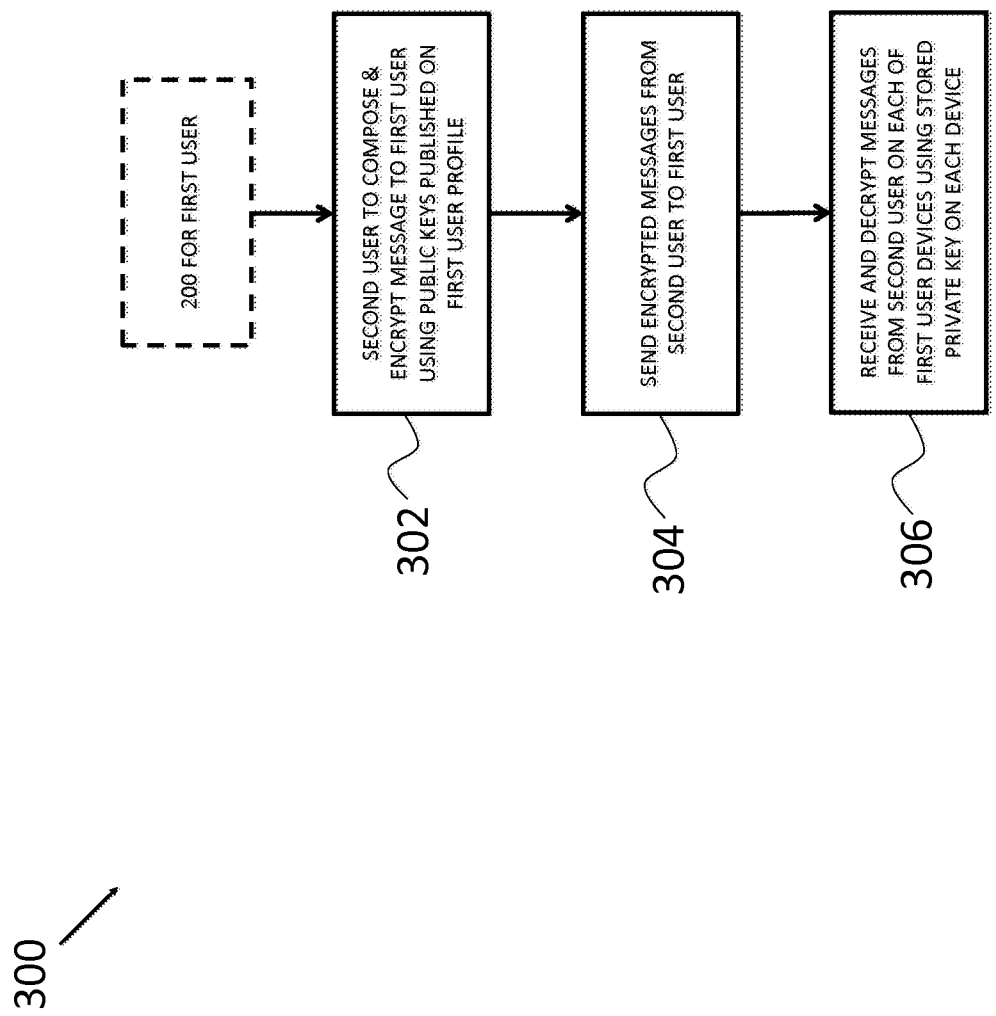
FIG. 3 is a flow chart illustrating a method of performing secure end to end encrypted communications between users (i.e., a first user and a second user) according to an exemplary embodiment of the present general inventive concept.

FIG. 3 is a flow chart illustrating a method 300 of performing secure end to end encrypted communications between users (i.e., a first user and a second user) according to an exemplary embodiment of the present general inventive concept. That is, FIG. 3 illustrates a method 300 for sending a secure message from a second user to a first user, where the message is encrypted distinctly for each device of the first user.

Prior to composing and encrypting a message from the second user to the first user in 302, process step 200 was completed by the first user, leading to a first user profile stored in the repository 106 with published public keys for each device of the first user.

At step 302, the secure messaging application 110a executed on the second user's device 110 retrieves the public keys published on the first user profile from the repository 106 via the application server 104, and uses the published public keys corresponding to the first user to encrypt a message to the first user.

At step 304, the encrypted message is then sent to the first user from the second user using the secure messaging application 110a via the application server 104.

At step 306, the first user receives or retrieves the encrypted message from the application server 104 via the first user's secure messaging application 108a on each of the first user's devices and using the first user's private key stored locally on each device, decrypts the message encrypted for each device using its corresponding public key published to the first user profile.

Figure 4:
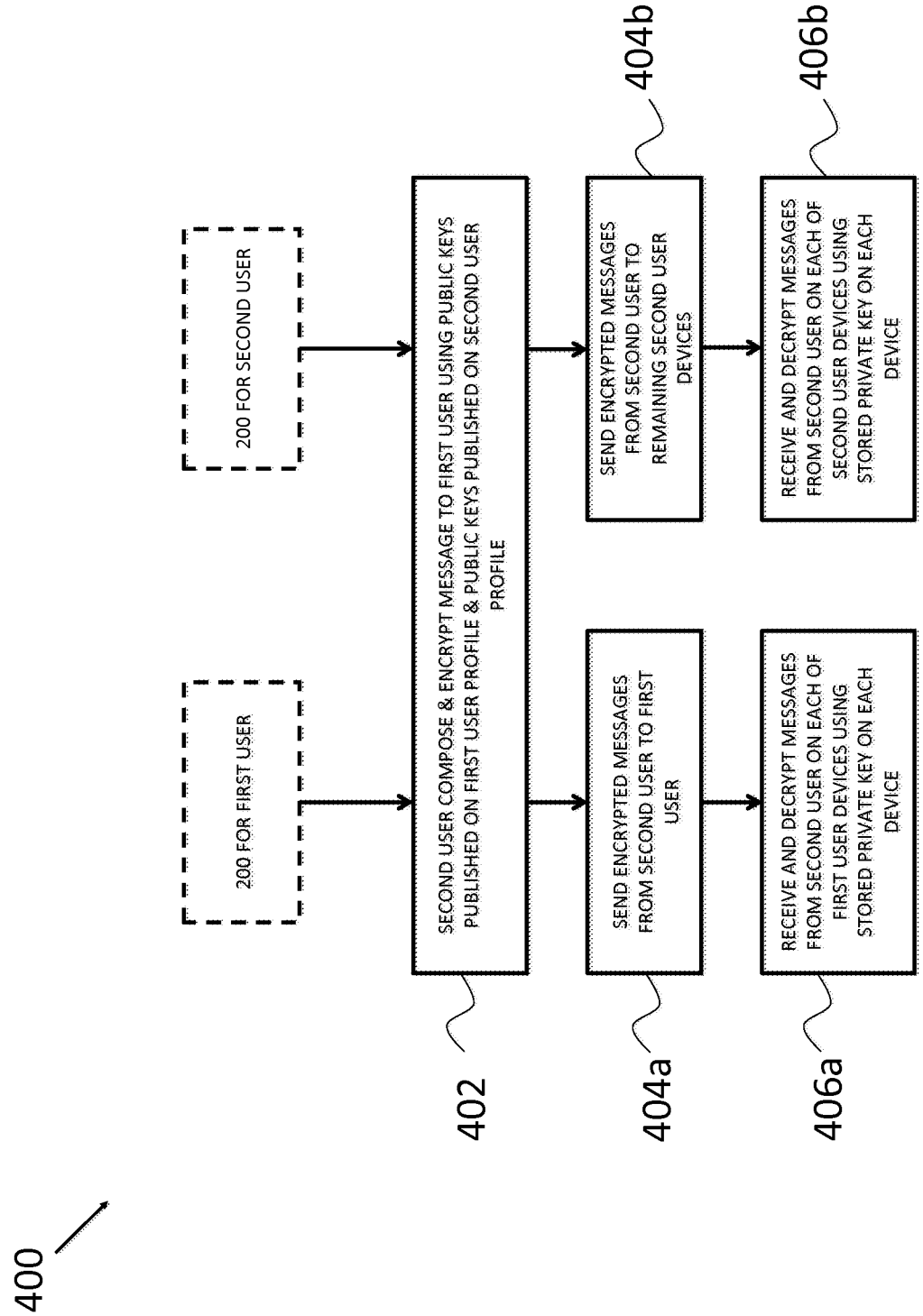
FIG. 4 is a flow chart illustrating a method of performing secure end to end encrypted communications between users (i.e., a first user and a second user) according to another exemplary embodiment of the present general inventive concept.

FIG. 4 is a flow chart illustrating a method 400 of performing secure end to end encrypted communications between users (i.e., a first user and a second user) according to another exemplary embodiment of the present general inventive concept. The method 400 according to the present exemplary embodiment is substantially similar to the method 300 described above, further including a second user registering at least one device to the application server 104 by completing process step 200.

At step 402, the second user composes and encrypts a message on one device corresponding to the second user using the published public keys for the first user and the published public keys for the second user stored within the repository 106 via the application server 104 and the secure messaging application 110a on the second user's device.

At step 404a, the encrypted message is then sent to the first user from the second user using the secure messaging application 110a via the application server 104.

At step 404b, the encrypted message is then sent from the second user to the remaining devices corresponding to the second user using the secure messaging application 110a via the application server 104. In an exemplary embodiment, steps 404a and steps 404b may be performed simultaneously.

At step 406a, the encrypted message sent from the second user is received and decrypted on each of the first user devices registered to the application server 104 using the stored private key on each first user device.

At step 406b, the encrypted message sent from the second user is also received and decrypted on each of the second user devices registered to the application server 104 using the stored private key on each second user device. That is, the encrypted message sent from the second user to the first user is also sent to the remaining devices registered to the second user using the secure messaging application 110a via the application server 104.

In an alternative exemplary embodiment, at step 402, the second user composes and encrypts a message with a symmetric key on one device corresponding to the second user and encrypts the symmetric key using the published public keys for the first user and the published public keys for the second user stored within the repository 106 via the application server 104 and the secure messaging application 110a on the second users device. Then, at step 404a, the encrypted message and encrypted symmetric key are then sent to the first user from the second user using the secure messaging application 110a via the application server 104.

Similarly, at step 404b, the encrypted message and encrypted symmetric key are then sent from the second user to the remaining devices corresponding to the second user using the secure messaging application 110a via the application server 104. Then at step 406a, on receiving or retrieving the encrypted message and encrypted symmetric key using the secure messaging application 108a via the application server 104, the first user decrypts the symmetric key with the private key stored on each of the first user's devices, and then decrypts the encrypted message with the decrypted symmetric key.

Similarly in step 406b, on receiving or retrieving the encrypted message and encrypted symmetric key using the secure messaging application 110a via the application server 104 on the second user's remaining devices, the second user decrypts the symmetric key with the private key stored on each of the second user's devices, and then decrypts the encrypted message with the decrypted symmetric key.

Figure 5:
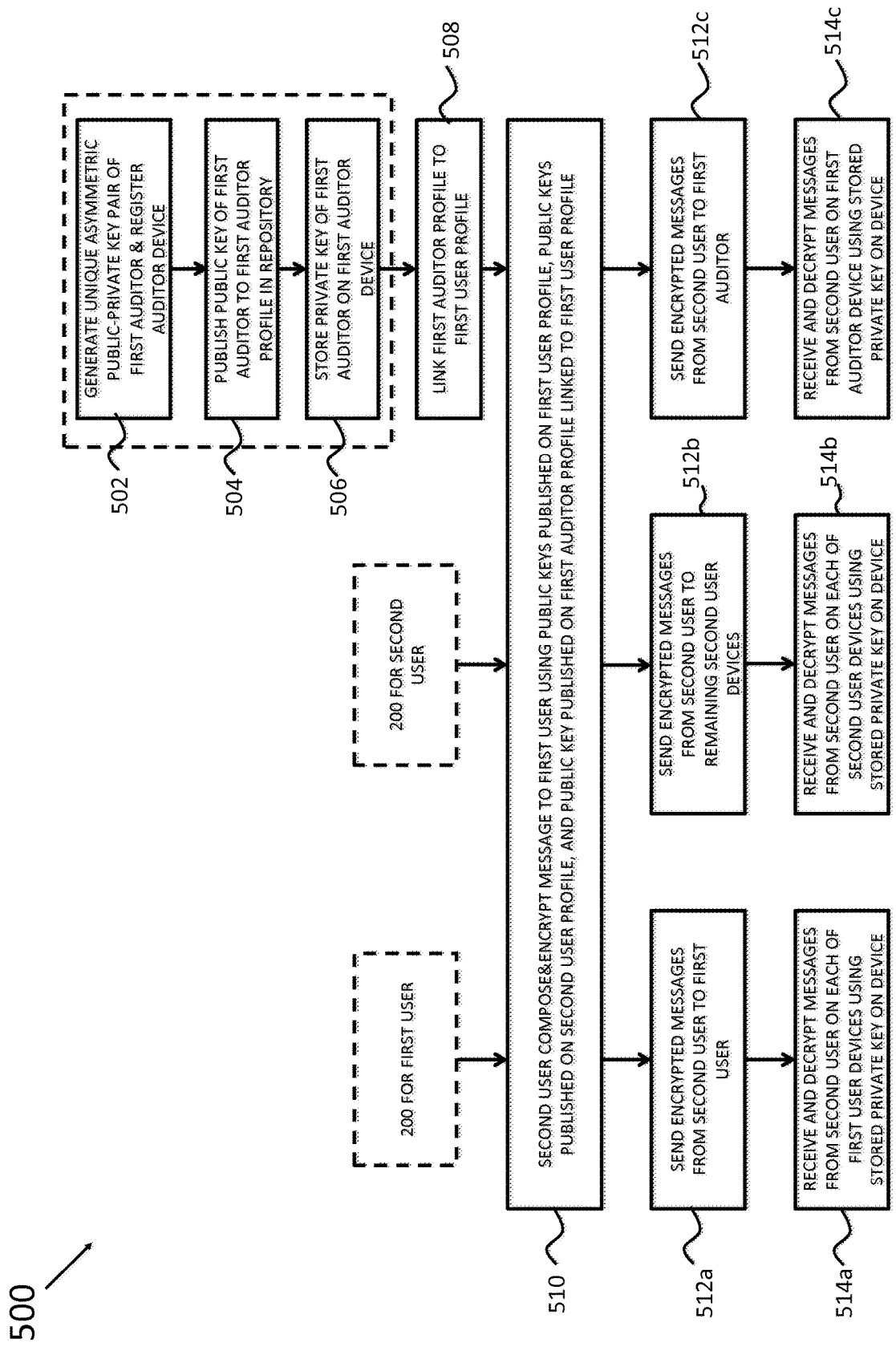
FIG. 5 is a flow chart illustrating a method of performing secure end to end encrypted communications between users (i.e., a first user, a second user, and a first auditor) according to another exemplary embodiment of the present general inventive concept.

FIG. 5 is a flow chart illustrating a method 500 of performing secure end to end encrypted communications between users (i.e., a first user, a second user, and a first auditor) according to another exemplary embodiment of the present general inventive concept.

The method 500 according to the present exemplary embodiment is substantially similar to the method 400 described above, further including registering and linking a first auditor to the first user profile. In the present exemplary embodiment, the method 500 performs and audits secure end to end encrypted communications between users, where the messages are encrypted distinctly for each device of all users, including the first and second user and the auditor. First, prior to initiating method 500, process step 200 is performed and completed for a first user and a second user.

At step 502, a unique asymmetric public-private key pair is generated on at least one device corresponding to a first auditor, and the device is registered with the secure messaging application 104. (See FIG. 1).

At step 504, the public key of the first auditor is published to a first auditor profile via the application server 104, where the auditor profile with published public keys corresponding to the first auditor is stored in the repository 106.

At step 506, the private key of the unique asymmetric public-private key pair generated on the first auditor device is stored on the device it was generated on and remains solely on that device.

At step 508, an administrator links the first auditor profile to the first user profile using the administrator application 116a or a web application on the application server 104 accessed via a browser 116b. (See FIG. 1).

Next, at step 510, the second user (sender) may compose and encrypt a message to the first user (receiver) from one of the devices corresponding to the second user. As the message is being composed in step 510 from the second user to the first user, the second user's secure messaging application 110a retrieves the published public keys corresponding to the first user on the first user's profile, the published public keys corresponding to the second user on the second user's profile, and the published public keys corresponding to the auditor (i.e., the first auditor) linked to the first user's profile from the repository 106 via the application server 104, and then uses the published public keys to encrypt a message for the first user, the second user, and the first auditor.

At steps 512a, 512b, and 512c, the encrypted message is then sent to the first user, the second user, particularly to the remaining registered devices corresponding to the second user, and the first auditor linked to the first user's profile using the secure messaging application 110a via the application server 104. In the present exemplary embodiment, steps 512a, 512b, and 512c may be performed simultaneously.

At step 514a, the first user receives or retrieves the encrypted message from the application server 104 via the first user's secure messaging application 108a on each device corresponding to the first user and using the particular device's locally stored private key, decrypts the message that was previously encrypted for each device of the first user using its corresponding public key published to the first user profile.

At step 514b, the second user receives or retrieves the encrypted message from the application server 104 via the second user's secure messaging application 110a on each device corresponding to the second user and using the particular device's locally stored private key, decrypts the message that was previously encrypted for each device of the second user using its corresponding public key published to the second user profile.

At step 514c, the first auditor receives or retrieves the encrypted message from the application server 104 via the first auditor's audit review application 112a on each device corresponding to the first auditor and using the particular device's locally stored private key, decrypts the message that was previously encrypted for each device of the first auditor using its corresponding public key published to the first auditor profile.

In an alternative exemplary embodiment, at step 510, the second user composes and encrypts a message with a symmetric key on one device corresponding to the second user and encrypts the symmetric key using the published public keys for the first user, the published public keys for the second user, and the published public key for the first auditor linked to the first user profile stored within the repository 106 via the application server 104 and the secure messaging application 110a on the second users device.

Then, at step 512a, the encrypted message and encrypted symmetric key are then sent to the first user from the second user using the secure messaging application 110a via the application server 104.

Similarly, at step 512b, the encrypted message and encrypted symmetric key are then sent from the second user to the remaining devices corresponding to the second user using the secure messaging application 110a via the application server 104.

Similarly, at step 512c, the encrypted message and encrypted symmetric key are then sent from the second user to the first auditor linked to the first user profile using the secure messaging application 110a via the application server 104.

In the current embodiment, steps 512a, 512b, and 512c may also be performed simultaneously.

Then at step 514a, on receiving or retrieving the encrypted message and encrypted symmetric key using the secure messaging application 108a via the application server 104, the first user decrypts the symmetric key with the private key stored on each of the first user's devices, and then decrypts the encrypted message with the decrypted symmetric key.

Similarly in step 514b, on receiving or retrieving the encrypted message and encrypted symmetric key using the secure messaging application 110a via the application server 104 on the second user's remaining devices, the second user decrypts the symmetric key with the private key stored on each of the second user's devices, and then decrypts the encrypted message with the decrypted symmetric key.

Then at step 514c, on receiving or retrieving the encrypted message and encrypted symmetric key using the audit review application 112a via the application server 104, the first auditor decrypts the symmetric key with the private key stored on each of the first auditor's devices, and then decrypts the encrypted message with the decrypted symmetric key.

Figure 6:
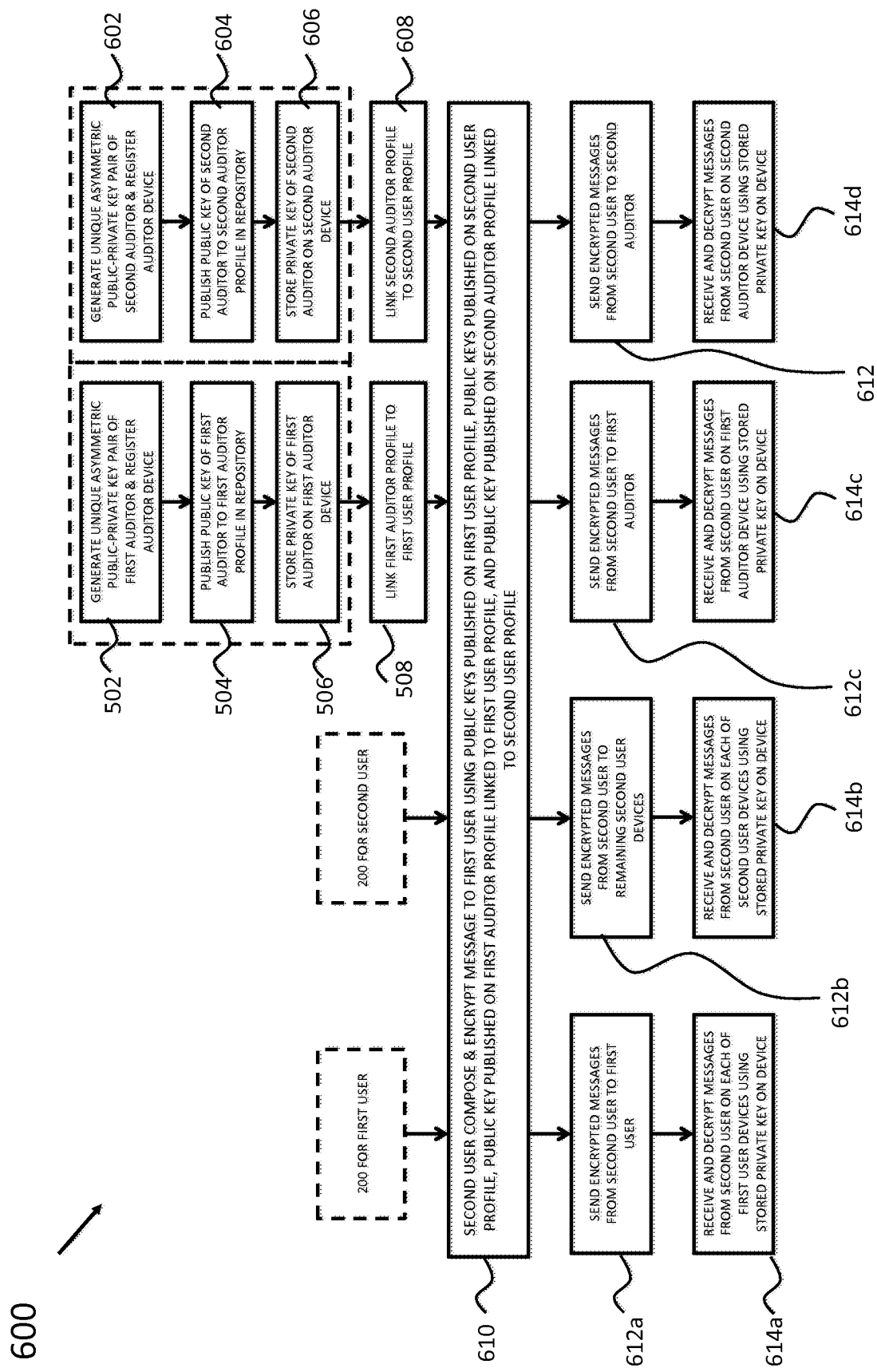
FIG. 6 is a flow chart illustrating a method of performing secure end to end encrypted communications between users (i.e., a first user, a second user, a first auditor, and a second auditor) according to another exemplary embodiment of the present general inventive concept.

FIG. 6 is a flow chart illustrating a method 600 of performing secure end to end encrypted communications between users (i.e., a first user, a second user, a first auditor, and a second auditor) according to another exemplary embodiment of the present general inventive concept. The method 600 according to the present exemplary embodiment is substantially similar to the method 500 described above, further including registering and linking a second auditor to the second user profile.

In the present exemplary embodiment, the first auditor is able to review messages as received by the first user, and the second auditor is able to review messages sent by the second user. If the roles were reversed (sender and receiver roles) and the first user sent a message to the second user, the first auditor would be able to review the message sent by the first user, and the second auditor would be able to review the message received by the second user.

First, prior to initiating method 600, process step 200 is performed and completed for a first user and a second user.

At step 502, a unique asymmetric public-private key pair is generated on at least one device corresponding to a first auditor, and the device is registered with the secure messaging application server 104.

At step 504, the public key of the first auditor is published to a first auditor profile via the application server 104, where the auditor profile with published public keys corresponding to the first auditor is stored in the repository 106.

At step 506, the private key of the unique asymmetric public-private key pair generated on the first auditor device is stored on the device it was generated on and remains solely on that device.

At step 508, an administrator links the first auditor profile to the first user profile using the administrator application 116a or a web application on the application server 104 accessed via a browser 116b.

At step 602, a unique asymmetric public-private key pair is generated on at least one device corresponding to a second auditor, and the device is registered with the secure messaging application server 104.

At step 604, the public key of the second auditor is published to a second auditor profile via the application server 104, where the auditor profile with published public keys corresponding to the second auditor is stored in the repository 106.

At step 606, the private key of the unique asymmetric public-private key pair generated on the second auditor device is stored on the device it was generated on and remains solely on that device.

At step 608, an administrator links the second auditor profile to the second user profile using the administrator application 116a or a web application on the application server 104 accessed via a browser 116b.

Next, at step 610, the second user may compose and encrypt a message or response to the first user from one of the devices corresponding to the second user. As the message is being composed in step 610 from the second user to the first user, the second user's secure messaging application 110a retrieves the published public keys corresponding to the first user on the first user's profile, the published public keys corresponding to the second user on the second user's profile, the published public keys corresponding to the first auditor linked to the first user's profile, and the published public keys corresponding to the second auditor linked to the second user's profile from the repository 106 via the application server 104, and then uses the published public keys to encrypt a message for the first user, the second user, the first auditor, and the second auditor.

At steps 612a, 612b, 612c, and 612d, the encrypted message is then sent to the first user, the second user, particularly to the remaining registered devices corresponding to the second user, the first auditor linked to the first user's profile, and the second auditor linked to the second user's profile using the secure messaging application 110a via the application server 104. In the present exemplary embodiment, steps 612a, 612b, 612c, and 612d may be performed simultaneously.

At step 614a, the first user receives or retrieves the encrypted message from the application server 104 via the first user's secure messaging application 108a on each device corresponding to the first user and using the particular device's locally stored private key, decrypts the message that was previously encrypted for each device of the first user using its corresponding public key published to the first user profile.

At step 614b, the second user receives or retrieves the encrypted message from the application server 104 via the second user's secure messaging application 110a on each device corresponding to the second user and using the particular device's locally stored private key, decrypts the message that was previously encrypted for each device of the second user using its corresponding public key published to the second user profile.

At step 614c, the first auditor receives or retrieves the encrypted message from the application server 104 via the first auditor's audit review application 112a on each device corresponding to the first auditor and using the particular device's locally stored private key, decrypts the message that was previously encrypted for each device of the first auditor using its corresponding public key published to the first auditor profile.

At step 614d, the second auditor receives or retrieves the encrypted message from the application server 104 via the second auditor's audit review application 114a on each device corresponding to the second auditor and using the particular device's locally stored private key, decrypts the message that was previously encrypted for each device of the second auditor using its corresponding public key published to the second auditor profile.

In an alternative exemplary embodiment, at step 610, the second user composes and encrypts a message with a symmetric key on one device corresponding to the second user and encrypts the symmetric key using the published public keys for the first user, the published public keys for the second user, the published public key for the first auditor linked to the first user profile, and the published public key for the second auditor linked to the second user profile stored within the repository 106 via the application server 104 and the secure messaging application 110a on the second user's device.

Then, at step 612a, the encrypted message and encrypted symmetric key are then sent to the first user from the second user using the secure messaging application 110a via the application server 104.

Similarly, at step 612b, the encrypted message and encrypted symmetric key are then sent from the second user to the remaining devices corresponding to the second user using the secure messaging application 110a via the application server 104.

Similarly, at step 612c, the encrypted message and encrypted symmetric key are then sent from the second user to the first auditor linked to the first user profile using the secure messaging application 110a via the application server 104.

Similarly, at step 612d, the encrypted message and encrypted symmetric key are then sent from the second user to the second auditor linked to the second user profile using the secure messaging application 110a via the application server 104. In the present exemplary embodiment, steps 612a, 612b, 612c, and 612d may be performed simultaneously.

Then at step 614a, on receiving or retrieving the encrypted message and encrypted symmetric key using the secure messaging application 108a via the application server 104, the first user decrypts the symmetric key with the private key stored on each of the first user's devices, and then decrypts the encrypted message with the decrypted symmetric key.

Similarly in step 614b, on receiving or retrieving the encrypted message and encrypted symmetric key using the secure messaging application 110a via the application server 104 on the second user's remaining devices, the second user decrypts the symmetric key with the private key stored on each of the second user's devices, and then decrypts the encrypted message with the decrypted symmetric key.

Then at step 614c, on receiving or retrieving the encrypted message and encrypted symmetric key using the audit review application 112a via the application server 104, the first auditor decrypts the symmetric key with the private key stored on each of the first auditor's devices, and then decrypts the encrypted message with the decrypted symmetric key.

Then at step 614d, on receiving or retrieving the encrypted message and encrypted symmetric key using the audit review application 114a via the application server 104, the second auditor decrypts the symmetric key with the private key stored on each of the second auditor's devices, and then decrypts the encrypted message with the decrypted symmetric key.

It is to be understood that the foregoing illustrative exemplary embodiments have been provided merely for the purpose of explanation and are in no way to be construed as limiting of the present general inventive concept. Words used herein are words of description and illustration, rather than words of limitation. In addition, the advantages and objectives described herein may not be realized by each and every exemplary embodiment practicing the present general inventive concept. Further, although the present general inventive concept has been described herein with reference to particular structure, steps and/or exemplary embodiments, the present general inventive concept is not intended to be limited to the particulars disclosed herein. Rather, the present general inventive concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the present general inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of performing and auditing secure end to end communication between users, the method comprising:
registering a plurality of separate devices corresponding to a first user having a first user profile and a second user having a second user profile stored within a repository, each device having a unique asymmetric public-private key pair;
publishing the public key of each separate device of the first user on the first user profile and the second user on the second user profile;
registering a separate auditor device corresponding to a first auditor having a first auditor profile stored within the repository, the auditor device having a unique auditor asymmetric public-private key pair;
publishing the public key of the separate auditor device corresponding to the first auditor on the first auditor profile;
linking the first auditor profile to the first user profile;
using the published public keys on the first user profile and the published public key on the first auditor profile linked to the first user profile and the published public keys on the second user profile, a second user encrypting and sending a secure message to the first user, the first auditor, and the remaining devices of the second user;
receiving and decrypting the encrypted secure message from the second user on all registered devices corresponding to the first user stored within the repository;
receiving and decrypting the encrypted secure message from the second user on the auditor device corresponding to the first auditor linked to the first user profile; and
receiving and decrypting the encrypted secure message from the second user on all remaining registered devices corresponding to the second user stored within the repository,
wherein an auditor device is registered corresponding to a second auditor having a second auditor profile stored within the repository, the auditor device having a unique auditor asymmetric public-private key pair, the method further comprising
publishing the public key of the auditor device corresponding to the second auditor on the second auditor profile;
linking the second auditor profile to the second user profile,
wherein using the published public keys on the second auditor profile linked to the second user profile, the published public keys on the first user profile and the published public key on the first auditor profile linked to the first user profile and the published public keys on the second user profile, a second user encrypts and sends a secure message to the first user, the first auditor whose profile is linked to the first user profile, the second auditor whose profile is linked to the second user profile, and the remaining devices of the second user;
receiving and decrypting the encrypted secure message from the second user on all registered devices corresponding to the first user stored within the repository;
receiving and decrypting the encrypted secure message from the second user on the auditor device corresponding to the first auditor linked to the first user profile;
receiving and decrypting the encrypted secure message from the second user on the auditor device corresponding to the second auditor linked to the second user profile; and
receiving and decrypting the encrypted secure message from the second user on all remaining registered devices corresponding to the second user stored within the repository.

2. A method of claim 1, wherein the receiving and decrypting the encrypted secure message from the second user occurs on the auditor device corresponding to the auditor linked to the first user profile when the second user encrypted and sent the secure message.

3. A method of claim 1, wherein the receiving and decrypting the encrypted secure message from the second user occurs on the auditor device corresponding to the first auditor linked to the first user profile and the auditor device corresponding to the second auditor linked to the second user profile when the second user encrypted and sent the secure message.

4. A computer based secure end to end communication system, the system comprising:
- a secure messaging application server to register a plurality of separate devices corresponding to a first user having a first user profile a second user having a second user profile stored within a repository, each device having a unique asymmetric public-private key pair;
- the secure messaging application server to publish the public key of each separate device of the first and second users on the first user profile and the second user profile respectively;
- the secure messaging application server to store the private key of each separate device on corresponding device of the first or second user;
- wherein the second user encrypts a message to the first user with a symmetric key, the system further comprising
- encrypting the symmetric key with each of the published pubic keys on the first user profile;
- encrypting the symmetric key with the published public key on an auditor profile linked to the first user profile;
- encrypting the symmetric key with each of the published public keys on the second user profile;
- sending the encrypted message and the encrypted symmetric keys to the first user, the auditor, and the remaining devices on the second user profile;
- receiving and decrypting the encrypted symmetric key using the stored private key on each device of the first users;
- receiving and decrypting the encrypted secure message using the decrypted symmetric key decrypted on all registered devices corresponding to the first user stored within the repository;
- receiving and decrypting the encrypted symmetric key using the stored auditor private key on the auditor device;
- receiving and decrypting the encrypted secure message using the decrypted symmetric key decrypted on the auditor device;
- receiving and decrypting the encrypted symmetric key using the stored private key on each of the remaining devices of the second user; and
- receiving and decrypting the encrypted secure message using the decrypted symmetric key decrypted on all of the remaining registered devices corresponding to the second user stored within the repository.

* * * * *